United States Patent
Puura

(10) Patent No.: US 8,452,454 B2
(45) Date of Patent: May 28, 2013

(54) METHOD, APPARATUS AND COMPUTER PROGRAM FOR ADJUSTING HYDRAULICALLY OPERATED BOOM

(75) Inventor: Jussi Puura, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 456 days.

(21) Appl. No.: 12/681,012

(22) PCT Filed: Sep. 29, 2008

(86) PCT No.: PCT/FI2008/050541
§ 371 (c)(1),
(2), (4) Date: Jun. 29, 2010

(87) PCT Pub. No.: WO2009/043969
PCT Pub. Date: Apr. 9, 2009

(65) Prior Publication Data
US 2010/0280668 A1    Nov. 4, 2010

(30) Foreign Application Priority Data
Oct. 1, 2007  (FI) ........................ 20075691

(51) Int. Cl.
    G05B 19/02    (2006.01)
    G01D 18/00    (2006.01)
(52) U.S. Cl.
    USPC ............................................ 700/263; 701/50
(58) Field of Classification Search
    USPC ............... 700/70, 260, 282, 263; 701/50, 69, 701/301; 60/422–434; 37/348
    See application file for complete search history.

(56) References Cited

U.S. PATENT DOCUMENTS

| 4,805,086 | A  | * | 2/1989  | Nielsen et al. ................. 700/59 |
| 5,357,424 | A  |   | 10/1994 | Kakizaki et al. |
| 5,953,977 | A  |   | 9/1999  | Krishna et al. |
| 6,140,787 | A  |   | 10/2000 | Lokhorst et al. |
| 6,473,679 | B1 | * | 10/2002 | Tady et al. ...................... 701/50 |
| 7,457,698 | B2 | * | 11/2008 | Danko ............................ 701/50 |

(Continued)

FOREIGN PATENT DOCUMENTS

| EP | 0 605 050   | 7/1994  |
| WO | 00/34617    | 6/2000  |
| WO | 2006/117022 | 11/2006 |

*Primary Examiner* — Dave Robertson
(74) *Attorney, Agent, or Firm* — Morgan, Lewis & Bockius LLP

(57) ABSTRACT

The invention relates to a method and apparatus as well as to a computer program for adjusting the operation of a hydraulically operated boom, the boom (1) comprising at least two mutually movably coupled boom parts (1*a*, 1*b*), which are coupled to move with respect to one another by means of a hydraulic actuator (5*a*-5*b*, 7*a*-7*b*), control means (13, 14) for controlling the hydraulic actuators, a detector (15) for detecting the position between the boom parts (1*a*, 1*b*), whereby for adjusting the operation of the boom (1) it is possible to configure a movement-specific adjustment parameter of the joint controller in the control means (13, 14) for each particular movement. In the invention the mutual movement of the boom parts (1*a*, 1*b*) is controlled with respect to a predetermined position, on both sides thereof, between the boom parts (1*a*, 1*b*), the actual position and motional speed values obtained from the detector (15) in response to the control signal are compared with the theoretical position and motional speed values, and the adjustment parameter of the joint controller is adjusted on the basis of the difference between the values.

31 Claims, 3 Drawing Sheets

U.S. PATENT DOCUMENTS

| | | | |
|---|---|---|---|
| 7,610,136 B2 * | 10/2009 | Okamura et al. | 701/50 |
| 8,065,037 B2 * | 11/2011 | Danko | 700/250 |
| 8,145,355 B2 * | 3/2012 | Danko | 700/251 |
| 8,200,398 B2 * | 6/2012 | Sahlin et al. | 701/50 |
| 8,204,653 B2 * | 6/2012 | Sahlin et al. | 701/50 |
| 2007/0058968 A1 * | 3/2007 | Chapman | 396/428 |
| 2008/0245065 A1 * | 10/2008 | Nakamura et al. | 60/426 |
| 2009/0272109 A1 * | 11/2009 | Pfaff | 60/368 |
| 2012/0233995 A1 * | 9/2012 | Kawasaki et al. | 60/419 |

\* cited by examiner

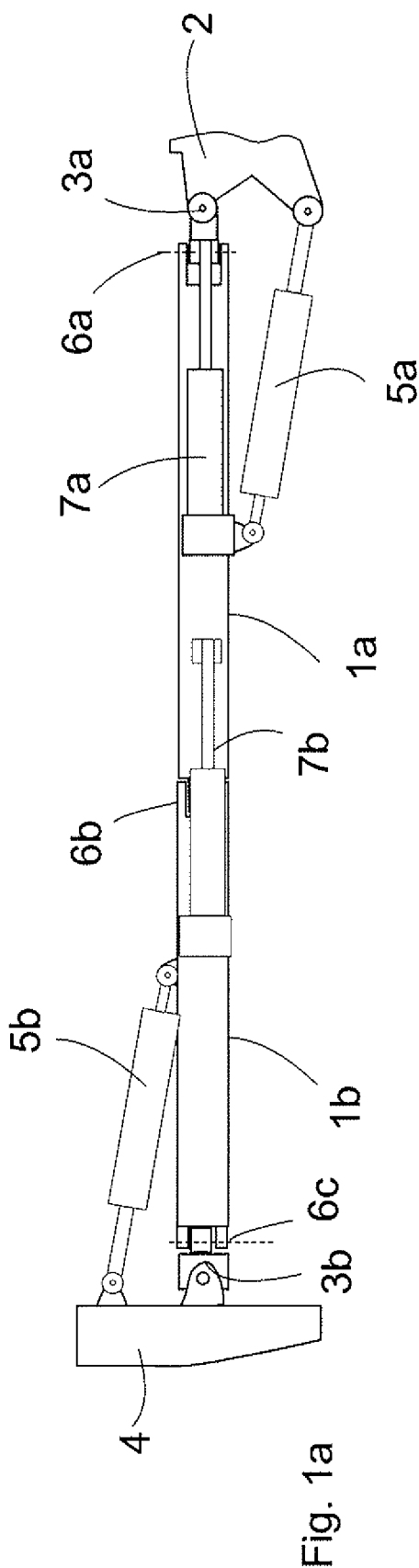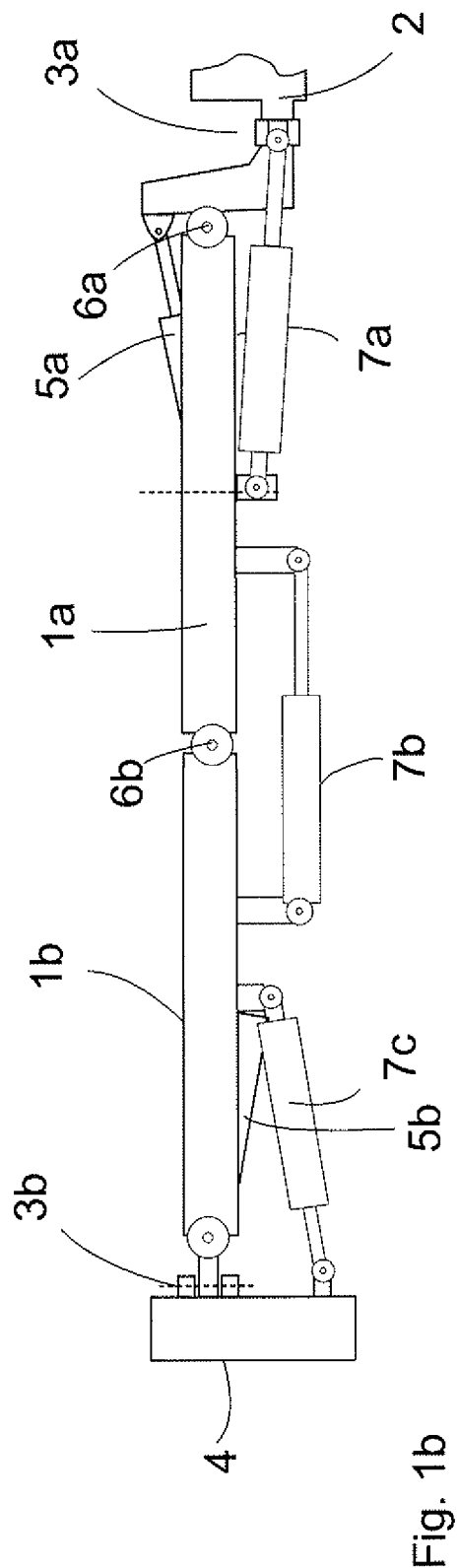

METHOD, APPARATUS AND COMPUTER PROGRAM FOR ADJUSTING HYDRAULICALLY OPERATED BOOM

CROSS REFERENCE TO RELATED APPLICATIONS:

This application is the National Stage of International Application No. PCT/FI2008/050541, filed Sep. 29, 2008, and claims benefit of Finnish Application No. 20075691, filed Oct. 1, 2007.

BACKGROUND OF THE INVENTION

The invention relates to a method for adjusting the operation of a hydraulically operated boom, the boom comprising at least two mutually movably coupled boom parts, which are coupled movably to rotate about an axis with respect to one another or to move in linear movement by means of a hydraulic actuator,
control means for controlling the hydraulic actuators,
a detector for detecting the movement and position between the boom parts,
each movement being controlled by a joint controller included in the control means and for adjusting the operation of the boom it is possible to configured a movement-specific adjustment parameter of the joint controller in the control means for each particular movement.

The invention further relates to an apparatus for adjusting the operation of a hydraulically operated boom, the boom comprising at least two mutually movably coupled boom parts, which are coupled movably to rotate about an axis with respect to one another or to move in linear movement by means of a hydraulic actuator, control means for controlling the hydraulic actuators, a detector for detecting the movement and position between the boom parts, each movement being controlled by a joint controller included in the control means and for adjusting the operation of the boom it is possible to configure a movement-specific adjustment parameter of the joint controller in the control means for each particular movement.

The invention still further comprises a computer program for controlling a processing unit comprised by the apparatus performing adjustment of the operation of a hydraulically operated boom, the boom comprising at least two mutually movably coupled boom parts, which are coupled movably to rotate about an axis with respect to one another or to move in linear movement by means of a hydraulic actuator, the apparatus comprising control means for controlling the hydraulic actuators, a detector for detecting the movement and position between the boom parts, each movement being controlled by a joint controller included in the control means and for adjusting the operation of the boom it is possible to configure a movement-specific adjustment parameter of the joint controller in the control means for each particular movement, the computer program comprising program code for adjusting the operation of the boom.

Multijoint, hydraulically operated booms are used in various apparatuses. Hydraulic booms are manipulators of "open chain" type, which consist of more than one successive joints, which are connected by a joint arm. The joints may be rotatable rotation joints or prismatic joints, in which the mutual movement of the joint arms is linear i.e. in a straight line. To achieve a Cartesian position of a boom end the joint angles of boom joints must be brought through adjustment to values calculated by inverse kinematics. Information on the joint positions is obtained by detectors, and the position data produced thereby is applied, when adjusting each joint, to a joint controller adjusting the position of the joint concerned. The joint controller is typically a digital processor application that controls the actuator altering the joint position such that the quantity of difference between the desired joint position and the actual position measured with the detector approaches zero as close as possible.

The object of the boom control is that a tool locating at the boom end is in a desired position with sufficient accuracy. On the other hand, the object is that the dynamic characteristics of the boom movement are as good as possible. Good dynamic characteristics refer to a positioning rate of the joints and thereby of the entire boom to a desired position and to minimum amount of oscillation in the actuators and the adjustable joints.

It is a challenging task in the case of hydraulic booms to tune the joint controller parameters implemented with software or comprised by control equipment such that the employed adjustment algorithm would make the boom behave in a desired manner, i.e. to obey alterations in the set value as faultlessly as possible. Due to the hydraulic boom's complex dynamics that is difficult to model it is challenging to tune the adjusters. In addition, parameter tuning of the joint controllers is challenging, because hydraulic booms are characterized by structural flexibility and elasticity. Optimal tuning of joint controllers differs greatly from the case of one degree of freedom, when it is required that the boom joints move simultaneously. It is difficult, if not outright impossible, to apply common tuning methods to joint controllers of multijoint manipulators. The management of boom control and adjustment is further complicated by the fact that as one joint is adjusted, acceleration and position changes of other joints as well as changes in the moment of inertia of the boom joint arms with respect to the adjustable joints affect the adjustment characteristics of the joint to be adjusted.

An alternative to the experimental tuning of adjusters is to produce an accurate mathematical model on the system to be adjusted and to tune the joint controllers on the basis of the model. However, this poses a problem that the produced model would represent accurately just one particular boom and each boom model should be modelled separately. In practice, this is not economically feasible, if a simpler experimental solution is available.

Currently, boom adjustment control is tuned by performing calculation of approximate values of various parameters on the case of one degree of freedom, and subsequently, the joint controller parameters are tuned joint by joint using the method of trial and error, until the desired behaviour is achieved. If the tuners are ill-informed about adjustment techniques, it may be impossible, in practice, to feed numeral values to serve as joint controller parameters. Eventually, the end result of the adjustment will only be based on visual assessment if there is no suitable method and indicators for the assessment of the end result.

BRIEF DESCRIPTION OF THE INVENTION

The object of the invention is to provide a method and apparatus for adjusting the operation of a hydraulically operated boom which is more simple and easier than the known art and which may be applied to various booms irrespective of the number and type of joints.

The method of the invention is characterized by controlling the mutual movement of boom parts in relation to a predetermined position between boom parts, on both sides thereof, with a symmetrical and repeated control signal, comparing the actual position and motional speed values obtained from the detector in response to the control signal with the theoretical position and motional speed values determined on the basis of the control signal, and adjusting an adjustment parameter of a joint controller on the basis of the differences between the values, until the difference between the actual position and motional speed values obtained from the detector and the theoretical position and motional speed values determined on the basis of the control signal is of desired magnitude.

The apparatus of the invention is characterized in that the apparatus is configurable to control the mutual movement of the boom parts in relation to a predetermined position between boom parts, on both sides thereof, with a symmetrical and repeated control signal, that the control means include means for comparing the actual position and motional speed values obtained from the detector in response to the control signal with the theoretical position and motional speed values determined on the basis of the control signal and means for adjusting an adjustment parameter of the joint controller on the basis of the differences between the values, until the difference between the actual position and motional speed values obtained from the detector and the theoretical position and motional speed values determined on the basis of the control signal is of desired magnitude.

The computer program of the invention is characterized by comprising program code for controlling the mutual movement of boom parts in relation to a predetermined position between boom parts, on both sides thereof, with a symmetrical and repeated control signal, for comparing the actual position and motional speed values obtained from the detector in response to the control signal with the theoretical position and motional speed values determined on the basis of the control signal, and for adjusting an adjustment parameter of the joint controller on the basis of the differences between the values, until the difference between the actual position and motional speed values obtained from the detector and the theoretical position and motional speed values determined on the basis of the control signal is of desired magnitude.

The basic idea of the invention is to feed a symmetrical, preferably sinusoidal control signal on both sides of the start position, i.e. zero position, to serve as a set value of an adjustable joint controller of boom part movement, whereby the boom parts are made to move in reciprocating motion and at the same time their mutual position is measured by means of an angle or position detector. Further, the basic idea of an embodiment is that the position and speed of the movement are presented on a display in a coordinate system of location and speed, which results in a substantially elliptical pattern. Yet another idea is that the pattern produced by the set value and the motional speed is compared with the pattern produced by the measured current value of a joint and the motional speed thereof in the coordinate system of location and speed, and on the basis of the difference the adjustment parameter, for instance controller gain, of the joint controller will be changed. Tuning is accomplished, when the measured, realized pattern corresponds to the set value pattern with sufficient accuracy.

BRIEF DESCRIPTION OF THE DRAWINGS

The invention will be described in greater detail in connection with the attached drawings, in which FIGS. 1a and 1b are schematic side and top views of a hydraulic boom, respectively.

DETAILED DESCRIPTION OF SOME EMBODIMENTS OF THE INVENTION

Figure 2:
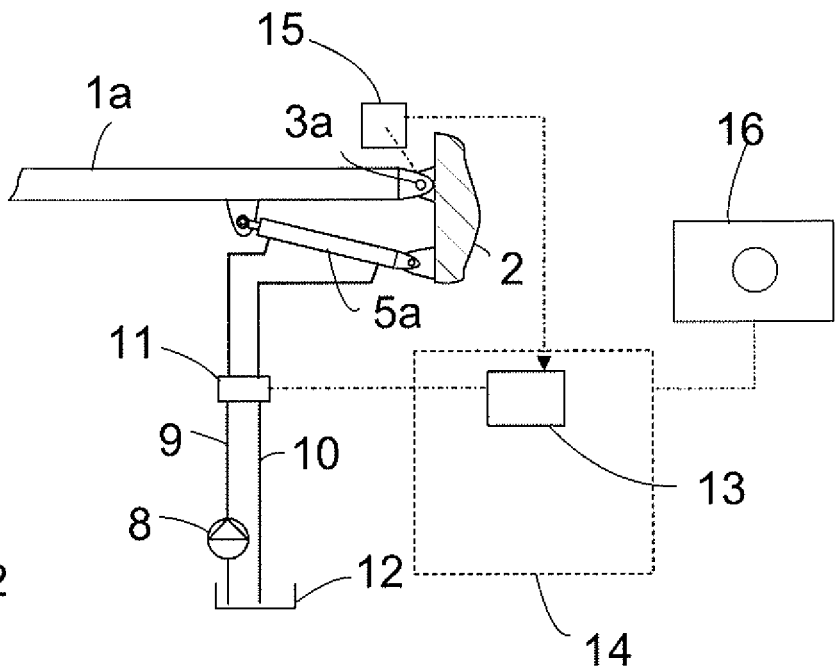
FIG. 2 is a schematic view of a control apparatus coupling for controlling the operation of the boom.

FIGS. 1a and 1b show a schematic side view, and correspondingly a top view, of a hydraulically operated boom 1, which is, for instance, a rock drilling rig boom having a plurality of boom parts 1a to 1b. The boom parts 1a to 1b are connected to one another and, on the other hand, to a schematically shown carrier 2 with a joint 3a, and at the end of the most distal boom part 1b there is a tool 4 coupled thereto with a joint 3b. The positioning of the tool 4 is performed by turning the boom parts 1a to 1b with respect to the carrier 2 and to one another and by turning the tool with respect to the boom part 1b. The boom is controlled with actuators 5a to 5b having effect over the carrier and the boom part joints 3a to 3c. Correspondingly, FIG. 1b shows joints 6a to 6c whose axes are transverse to joints 3a and 3b and about which the boom parts are turned with respect to the carrier and to one another with actuators 7a to 7c.

FIG. 2 shows schematically a coupling for controlling the boom in relation to one joint 3a. It comprises a boom part 1a that is coupled with a joint 3a to a carrier 2. Between the carrier 2 and the boom part 1a there is a hydraulic actuator 5a that is a hydraulic cylinder by way of example. A pump 8 feeds hydraulic fluid to the hydraulic cylinder through hydraulic fluid channels 9 and 10 via control valves 11, and correspondingly returns it to a hydraulic fluid container 12. The control valves 11 are connected for being controlled by a joint controller 13, and the joint controller 13, which is schematically shown as a part of a control unit 14, is controlled with the control unit 14. The joint 3a comprises an angle detector 15, which detects a turning angle between the boom part 1a and the carrier and which is coupled, shown in broken line, to the joint controller 13 and optionally also to the control unit 14 for detecting the turning angle. The joint controller may be a separate, electronically operating adjuster, a part of the electronically operating control unit or a part of software used for control, and in this patent application document and claims the joint controller refers to them all. The joint controller 13 selects the control of a control valve 11 at every time instant on the basis of the difference between the set value provided by the control unit 14 and the position information produced by the detector 15 in accordance with the chosen adjustment algorithm.

The joints may also be prismatic, and in that case the detector measures the linear movement between the joint arms instead of the angle. Further, the control equipment generally includes a display 16, on which the joint angles of the boom joints and/or the Cartesian position of the boom end or of the tool may be presented. In practice, in current computer-controlled apparatuses the joint controller and the control unit is typically the same processing unit i.e. microprocessor, that takes care of the control and the joint controller functions by means of software. Naturally, various other solutions known per se may also be used in the application of the invention.

Figure 3A:
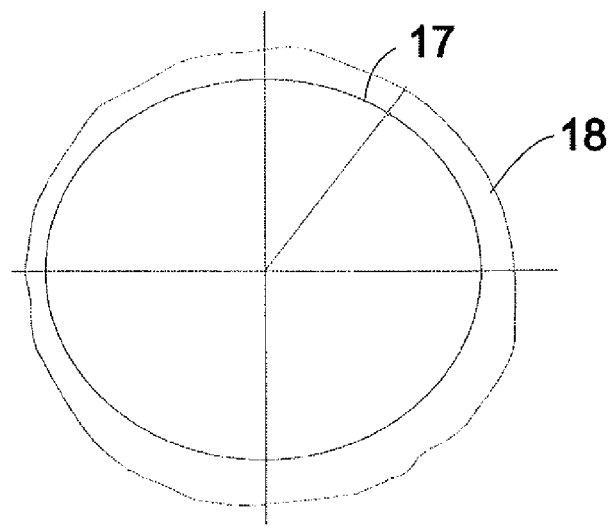
FIGS. 3a to 3c show schematically a possible user interface indication in tuning of a single-boom-joint controller.
Figure 3B:
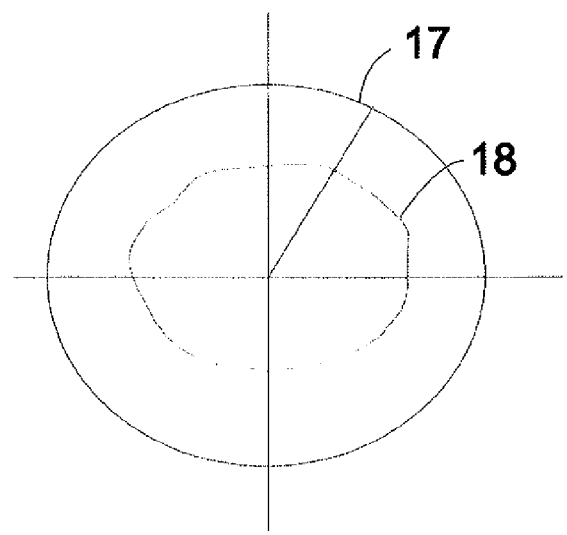
Figure 3C:
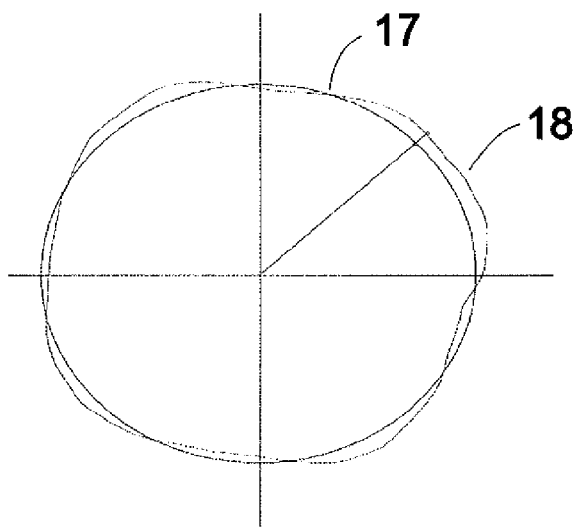

FIGS. 3a to 3c show schematically a user interface display in boom control for tuning a joint controller by using as an example the single-joint model of FIG. 2. FIG. 3a shows a display, in which the display shows a theoretical position/ speed descriptor of a given boom joint, which descriptor is in principle an ellipsis resulting from the characteristics of the sinusoidal signal fed as a set value and the derivative thereof. The theoretical, i.e. target descriptor 17 is the objective that is pursued in tuning the joint controller.

In joint tuning, a sinusoidal signal is entered as a set value for the joint controller 13, whereby the joint angle of the boom joint concerned changes in reciprocating movement, for instance, +/−2.5 degrees on either side of the position at the time of activation of the joint movement. This change in the joint angle is shown on the horizontal axis on the display. Correspondingly, the joint's motional speed, which is obtained theoretically by differentiating the control signal, is zero at the extreme position of the movement in the case of a sinusoidal position change and at its highest as the joint is at the midpoint of the sinusoidal position change. The speed, in turn, is presented on the display in the direction of the vertical axis, i.e. the y axis. By plotting a position value and a speed value at each time instant in the location/speed coordinate system, in theory, the formed descriptor draws an ellipsis. In practice, the descriptor obtained from the measurements of the joint position does not exactly follow the theoretical elliptical descriptor. The tuning aims at minimizing the difference between the pattern produced by the realized position and the theoretical elliptical pattern produced by the set value.

As FIG. 3a shows, the actual descriptor 18 of the boom position and motional speed is, for instance, approximately elliptical. It is essential that the realization pattern, i.e. descriptor 18, is found more inside than outside the set value pattern. Thus, the joint position does not follow the changing set value sufficiently well, but lags behind. In this situation, joint controller gain must be increased. The operator may change the joint controller gain simply with + and − keys, whereby a new parameter will be immediately in use. The operator may monitor in real time how the joint is able to follow the path by comparing the descriptors and adjust the joint controller parameters on the basis of the difference in patterns. If the realization pattern is more outside than inside the set value pattern, which situation is illustrated in FIG. 3b, the operator may reduce the joint controller gain with the—key, whereby the descriptors will approach one another. In theory, at this stage the descriptor 18 of the boom movement is an ellipsis of the size of the target descriptor 17, as shown in FIG. 3c. In practice, the realization descriptor includes various deviations from a theoretical ellipsis, and it is not possible to achieve a perfect elliptical descriptor. However, it is essential that the descriptor is as close as possible to the target ellipsis, whereby the accuracy of boom adjustment is as good as possible for this particular joint. When the descriptors are of the same size and shape, the path formed by the joint position is in full compliance with the path formed by the set value also in the time/position plane, even though there would appear time delay between the set value and the realized position of the joint controller. Correspondingly, it is also possible to adjust joint gains automatically by comparing the distance between the realization pattern and the set value pattern. When it is known that the speed and the position draw an ellipsis and monitoring the size and shape of this ellipsis allows conclusions to be drawn on the goodness of the tuning of the joint controllers, it is possible to compare the size of the realization ellipsis with the ideal size also automatically.

When the adjustment is carried out automatically, it is not necessary to draw any descriptors, but the theoretical and the actual position and speed values obtainable by the detector may be compared with one another mathematically, whereby automation carries out by calculation the same operation as the tuner in the manual tuning on the basis of descriptors drawn by the display device.

When a detector reading gives joint position data, i.e. the value of its position and speed, or the speed is calculated on the basis of successive position data items and the time elapsed in passage therebetween at a time instant, the realization may be compared with the planned by calculating the shortest distance between the realized point and the theoretical set value at every sampling moment. If the joint follows the sinusoidal path as well as possible, the mean of the distances between the measurement values and the theoretical set values for a full cycle is zero.

The error between the position and speed values and the set values is calculated at every sampling moment and it is averaged, when a full set value change sequence is achieved. By calculating the average of the errors, it is possible to obtain a direction and magnitude for the errors between the measured position and speed values and the set values. This information may be used for adjusting a parameter of the joint controller concerned so that the average of the error is minimized. After the calculation of the difference the joint controller gain is altered so that the change in gain is proportional to the magnitude of error.

The tuning is accomplished, when the difference is sufficiently close to zero. The realized position and speed values are then an equal amount higher than set values as they are lower than set values. Path is followed in the best possible manner in this situation.

Other joints are adjusted in the corresponding manner both in vertical and in horizontal directions. In order to achieve the best possible accuracy this must be performed also such that other boom joints are activated simultaneously as one joint is being adjusted, whereby disturbances caused by the operation of other joints to the operation of the joint concerned can be minimized. Thus, for the end result, the overall behaviour and dynamics of the boom will correspond in the best possible manner to what was intended.

The tuning of the boom joint controllers with the above method gives the best results in the boom position, around which the boom is controlled during tuning. In order to find out the best parameter values in different parts of the boom working area, the boom may be tuned in a plurality of different positions in various parts of the working area.

Once the boom behaviour has been adjusted, it is still necessary to check the static accuracy of the boom joints. This is performed, in the case of the example, by operating the joints to have locations, in which the joint path between the locations corresponds to a half-cycle of a sinusoidal signal. It is then possible to see on the display, at which accuracy the boom part is set in a desired position, and for instance, the oscillation of the boom or a boom part with respect to the final position as a function of time. This is illustrated in FIG. 4, which shows schematically and theoretically a movement descriptor of a boom part as a function of time.

Figure 4:
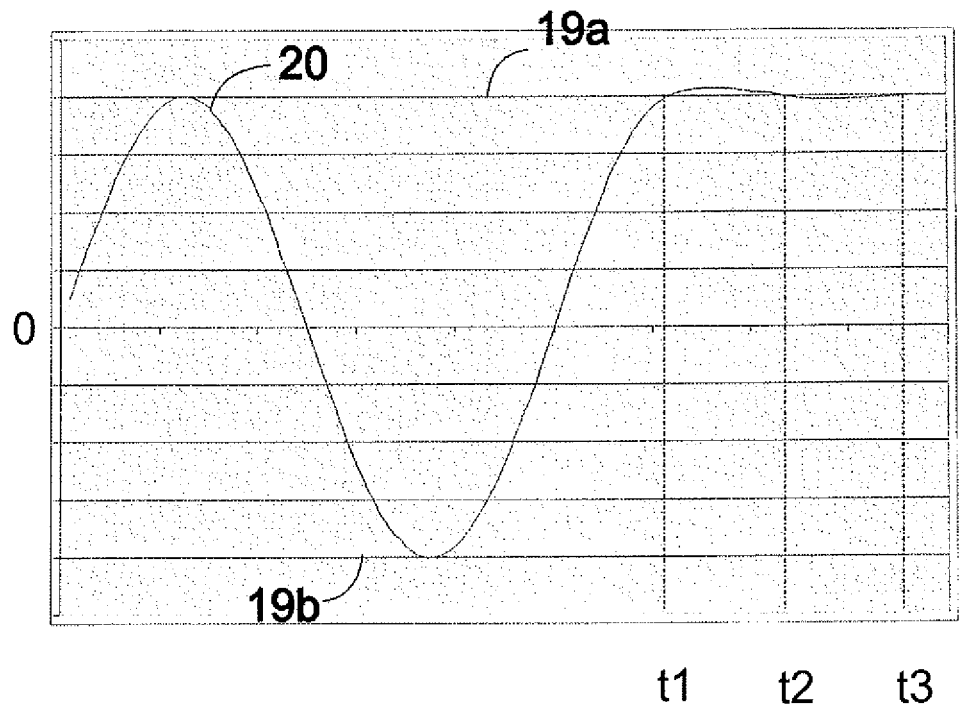
FIG. 4 shows schematically measurement of boom positioning accuracy.

As shown in FIG. 4, the boom or the boom part was turned in relation to the joint such that it has moved substantially in accordance with the target descriptor on both sides of the zero position between the lines 19a and 19b representing the extreme positions, until at time instant t1 the boom was stopped to an extreme position determined by a control signal, i.e. theoretically on line 19a. From there onwards the boom position should be constant, if the set value followed without overruns or underruns, and the position descriptor 18 should follow the line 19a. However, line 18 representing the boom position is not immediately at the same level with line 19a, but oscillates on both sides thereof. So, after time instant t1 the boom position is above the position defined by line 19a, whereafter it swings at time instant t2 below line 19a and thereafter returns close to line 19a, i.e. substantially to the intended position at time instant t3.

When the invention is implemented by means of a computer program, it comprises program code that provides adjustment of the operation of a boom in the above-described manner. Thus, the program code may implement adjustment of a controller gain of a joint controller and adjustment of movements between different boom parts starting from the carrier of the boom towards the distal end of the boom. Further, the program code may implement representation of a descriptor in the x/y coordinate system by means of position and motional speed values, one axis of the descriptor representing position values and the other axis representing motional speed values. The program code may also use a sinusoidal signal as a control signal, form a target pattern on a display on the basis of a control signal, in which target pattern the position and motional speed values are located on the different axes of an perpendicular coordinate system and adjust a controller gain on the basis of a corresponding descriptor defined on the basis of actual position and motional speed values obtained from a detector, produce a circular or elliptical descriptor, carry out adjustment automatically, and control the boom of a rock drilling rig.

The drawings and the relating description are only intended to illustrate the inventive idea. The details of the invention may vary within the scope of the claims.

The invention claimed is:

1. A method for adjusting the operation of a hydraulically operated boom, the boom comprising at least two mutually movably coupled boom parts, which are coupled movably to rotate about an axis with respect to one another or to move in linear movement by means of a hydraulic actuator, control means for controlling the hydraulic actuators, a detector for detecting the movement and position between the boom parts, each movement being controlled by a joint controller included in the control means and for adjusting the operation of the boom operable to configure a movement-specific adjustment parameter of the joint controller in the control means for each particular movement, the method comprising:

controlling the mutual movement of boom parts in relation to a predetermined position between the boom parts, on both sides thereof, with a symmetrical and repeated control signal, comparing the actual position and motional speed values obtained from the detector in response to the control signal with the theoretical position and motional speed values determined on the basis of the control signal, and adjusting an adjustment parameter of a joint controller on the basis of the differences between the values, until the difference between the actual position and motional speed values obtained from the detector and the theoretical position and motional speed values determined on the basis of the control signal is of desired magnitude.

2. The method of claim 1, comprising using a controller gain of the boom adjuster as the adjustment parameter.

3. The method of claim 1 wherein the adjustment of movements between the different boom parts is carried out starting from the boom carrier towards the distal end of the boom.

4. The method of claim 1, wherein the boom parts are coupled to one another rotatably about an axis, and a position detector detects a turning angle about the axis.

5. The method of claim 1, wherein the boom parts are coupled to one another movably in linear movement and a position detector detects the length of movement.

6. The method of claim 1, comprising forming a descriptor by means of the position and motional speed values in an x/y coordinate system whose one axis represents position values and the other axis motional speed values.

7. The method of claim 1, comprising using a sinusoidal signal as the control signal.

8. The method of claim 1, wherein on the basis of the control signal there is formed a target pattern on a display, in which the position and motional speed values are located on the different axes of the perpendicular coordinate system and the controller gain is adjusted on the basis of the corresponding descriptor defined on the basis of the actual position and motional speed values obtained from the detector.

9. The method of claim 6, wherein the descriptor is circular or elliptical in shape.

10. The method of claim 1, wherein the adjustment is carried out with control means automatically.

11. The method of claim 1, comprising using a boom of a rock drilling rig as the boom.

12. An apparatus for adjusting the operation of a hydraulically operated boom, the boom comprising at least two mutually movably coupled boom parts, which are coupled movably to rotate about an axis with respect to one another or to move in linear movement by means of a hydraulic actuator, control means for controlling the hydraulic actuators, a detector for detecting the movement and position between the boom parts, each movement being controlled by a joint controller included in the control means and for adjusting the operation of the boom operable to configure a movement-specific adjustment parameter of the joint controller in the control means for each particular movement, wherein the apparatus is configurable to control the mutual movement of boom parts in relation to a predetermined position between the boom parts, on both sides thereof, with a symmetrical control signal, that the control means include means for comparing the actual position and motional speed values obtained from the detector in response to the control signal with the theoretical position and motional speed values determined on the basis of the control signal, and means for adjusting an adjustment parameter of a joint controller provided in the control means on the basis of the differences between the values, until the difference between the actual position and motional speed values obtained from the detector and the theoretical position and motional speed values determined on the basis of the control signal is of desired magnitude.

13. The apparatus of claim 12, wherein the adjustment parameter of the joint controller used in the apparatus is a controller gain of the joint controller.

14. The apparatus of claim 12, wherein the apparatus is configured to adjust the movements between different boom parts starting from the boom carrier towards the distal end of the boom.

15. The apparatus of claim 12, wherein the boom parts are coupled to one another rotatably about an axis, and the position detector is configured to detect about the axis.

16. The apparatus of claim 12, wherein the boom parts are coupled to one another movably in linear movement and the position detector is configured to detect the length of movement.

17. The apparatus of claim 12, wherein the control means are configured to provide a descriptor by means of the position and motional speed values in an x/y coordinate system whose one axis represents position values and the other axis motional speed values.

18. The apparatus of claim 12, wherein the control means are configured to use a sinusoidal signal as a control signal.

19. The apparatus of claim 12, wherein the control means include a display and that the control means are configured to form a target pattern on the display on the basis of the control signal, in which pattern the position and motional speed values are located on the different axes of the perpendicular coordinate system and to form a corresponding descriptor on the basis of the actual position and motional speed values obtained from the detector such that the controller gain may be adjusted on the basis of the descriptors.

20. The apparatus of claim 18, wherein the control means are configured to form a circular or an elliptical descriptor.

21. The apparatus of claim 12, wherein the control means are configured to perform adjustment automatically.

22. The apparatus of claim 12, wherein the boom is the boom of a rock drilling rig.

23. A non-transitory computer-readable medium comprising:
a computer program for controlling a processing unit residing on an apparatus performing adjustment of the operation of a hydraulically operated boom, the boom comprising at least two mutually movably coupled boom parts, which are coupled movably to rotate about an axis with respect to one another or to move in linear movement by means of a hydraulic actuator, the apparatus comprising control means for controlling the hydraulic actuators, a detector for detecting the movement and position between the boom parts, each movement being controlled by a joint controller included in the control means and for adjusting the operation of the boom operable to configure a movement-specific adjustment parameter of the joint controller in the control means for each particular movement,
wherein the computer program comprises instructions for execution by the processing unit, wherein the instructions comprise steps for:
adjusting the operation of the boom,
controlling the mutual movement of boom parts in relation to a predetermined position between boom parts, on both sides thereof, with a symmetrical control signal,
comparing the actual position and motional speed values obtained from the detector in response to the control signal with the theoretical position and motional speed values determined on the basis of the control signal, and
adjusting an adjustment parameter of a joint controller on the basis of the differences between the values, until the difference between the actual position and motional speed values obtained from the detector and the theoretical position and motional speed values determined on the basis of the control signal is of desired magnitude.

24. The non-transitory computer-readable medium of claim 23, wherein the instructions further comprise steps for: adjusting the controller gain of the joint controller.

25. The non-transitory computer-readable medium of claim 23, wherein the instructions further comprise steps for: adjusting the movements between different boom parts starting from the boom carrier towards the distal end of the boom.

26. The non-transitory computer-readable medium of claim 23, wherein the instructions further comprise steps for: providing a descriptor by means of the position and motional speed data in an x/y coordinate system whose one axis represents position values and the other axis motional speed values.

27. The non-transitory computer-readable medium of claim 23, wherein the instructions further comprise steps for: using a sinusoidal signal as the control signal.

28. The non-transitory computer-readable medium of claim 23, wherein the instructions further comprise steps for: forming a target pattern on the display on the basis of the control signal, in which target pattern the position and motional speed values are located on the different axes of the perpendicular coordinate system and for adjusting the controller gain on the basis of a corresponding descriptor defined on the basis of the actual position and motional speed values obtained from the detector.

29. The non-transitory computer-readable medium of claim 27, wherein the instructions further comprise steps for: forming a circular or an elliptical descriptor.

30. The non-transitory computer-readable medium of claim 23, wherein the instructions further comprise steps for: performing the adjustment automatically.

31. The non-transitory computer-readable medium of claim 23, wherein the computer program controls the boom of a rock drilling rig.

* * * * *